(12) United States Patent
Xu

(10) Patent No.: US 9,939,668 B2
(45) Date of Patent: Apr. 10, 2018

(54) LCD DISPLAY DEVICE WITH SWITCHABLE ANGLE OF VIEW

(71) Applicant: SHENZHEN CHINA STAR OPTOELECTRONICS TECHNOLOGY CO., LTD., Shenzhen, Guangdong (CN)

(72) Inventor: Xiangyang Xu, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/647,113

(22) PCT Filed: May 12, 2014

(86) PCT No.: PCT/CN2014/077254
§ 371 (c)(1),
(2) Date: Oct. 18, 2016

(87) PCT Pub. No.: WO2015/149420
PCT Pub. Date: Oct. 8, 2015

(65) Prior Publication Data
US 2017/0199403 A1 Jul. 13, 2017

(30) Foreign Application Priority Data
Apr. 4, 2014 (CN) .......................... 2014 1 0135847

(51) Int. Cl.
*G09G 3/36* (2006.01)
*G06F 3/038* (2013.01)
(Continued)

(52) U.S. Cl.
CPC .......... *G02F 1/1323* (2013.01); *G02F 1/1368* (2013.01); *G02F 1/13452* (2013.01);
(Continued)

(58) Field of Classification Search
CPC ........................ G06F 3/04883; G06F 3/04845
See application file for complete search history.

(56) References Cited

U.S. PATENT DOCUMENTS

2010/0103085 A1* 4/2010 Lee .................... G02F 1/134363
345/92
2012/0069256 A1* 3/2012 Huang ............... G02F 1/134309
349/33

FOREIGN PATENT DOCUMENTS

CN  1892323 A    1/2007
CN  101059636 A  10/2007
(Continued)

*Primary Examiner* — Nan-Ying Yang

(57) ABSTRACT

The present invention provides an LCD display device with a switchable angle of view, comprising two grating lines, a signal line and a pixel components, the signal line running between the two grating lines, wherein each group of the pixel components comprises at least two display drivers and at least two conductive pixel films, the display drivers and the conductive pixel films being electrically connected to each other correspondingly; the display drivers are embedded into the grating lines, respectively, and are electrically connected to the grating lines. When the display drivers respectively disposed on different sides are turned on simultaneously, the LCD display device is switched to a narrow-angle mode; and when one of the display drivers is turned on separately or the display drivers disposed on a same side are turned on simultaneously, the LCD display device is switched to a wide-angle mode.

10 Claims, 2 Drawing Sheets

(51) Int. Cl.
*G09G 5/00* (2006.01)
*G09G 5/10* (2006.01)
*G02F 1/13* (2006.01)
*G02F 1/1368* (2006.01)
*G02F 1/1362* (2006.01)
*G02F 1/1345* (2006.01)

(52) U.S. Cl.
CPC ..... *G02F 1/136227* (2013.01); *G09G 3/3648* (2013.01); *G09G 2320/068* (2013.01)

(56) References Cited

FOREIGN PATENT DOCUMENTS

| | | |
|---|---|---|
| CN | 202025169 U | 11/2011 |
| CN | 103472637 A | 12/2013 |
| KR | 10-2008-0049304 A | 6/2008 |
| KR | 20110065742 A | 6/2011 |
| TW | 201213990 A | 4/2012 |

\* cited by examiner

LCD DISPLAY DEVICE WITH SWITCHABLE ANGLE OF VIEW

FIELD OF THE INVENTION

The present invention relates to an LCD display device and particularly to an LCD display device with a switchable angle of view.

BACKGROUND OF THE INVENTION

Recently, with the rapid development of the display technology, flat panel displays have replaced bulky CRT displays and have become increasingly popular in people's daily lives. At present, common flat panel displays include LCDs (Liquid Crystal Displays) and OLED (Organic Light-Emitting Diodes) displays. With the characteristics of small size, low power consumption, radiation-free, etc., the flat panel displays hold a dominant position in the present market of flat panel displays. Due to the immature OLED technology, LCDs still represent the present mainstream of flat panel displays. LCDs, according to the type, may be classified into: TN, VA, IPS and FFS displays. In terms of angle of view, VA, IPS and FFS displays are superior to TN displays. Narrow-angle TN displays are mainly applied to NBs and other mobile office products. Due to fixed and monotonous angle of view, the existing display products cannot be applicable to different application scenarios and hobbies. Therefore, it is necessary to provide a display device with a switchable view angle.

SUMMARY OF THE INVENTION

In order to solve the technical problems mentioned above, an objective of the present invention is to provide an LCD display device which changes the angle of view of a liquid crystal display by adjusting an electric field for controlling liquid crystal deflection.

The present invention provides an LCD display device with a switchable angle of view, including two grating lines, a signal line and pixel components, the signal line running between the two grating lines, wherein each group of the pixel components includes at least two display drivers and at least two conductive pixel films, the display drivers and the conductive pixel films being electrically connected to each other correspondingly; the display drivers are embedded into the grating lines, respectively, and are electrically connected to the grating lines; when the display drivers respectively disposed on different sides are turned on simultaneously, the LCD display device is switched to a narrow-angle mode; and, when one of the display drivers is turned on separately or the display drivers disposed on a same side are turned on simultaneously, the LCD display device is switched to a wide-angle mode.

Preferably, there is an even number of display drivers and an even number of conductive pixel films, respectively. If there are more than two display drivers, the display drivers on different sides are controlled by different control signals, and the display drivers on the same side are controlled by a same control signal.

Preferably, there are two display drivers and two conductive pixel films, respectively, the display drivers being an upper display driver and a lower display driver; when the upper display driver and the lower display driver are turned on simultaneously, the LCD display device is switched to a narrow-angle mode; and, when the upper display driver or the lower display driver is turned on separately, the LCD display device is switched to a wide-angle mode. The upper display driver and the lower display driver are controlled by different control signals. By controlling the drive states of the upper display driver and the lower display drivers via different control signals, the switchover between a wide-angle mode and a narrow-angle mode is realized.

Preferably, the two conductive pixel films are staggered with each other. Each of the conductive pixel film has a plurality of parallel gratings with a slit provided between adjacent gratings; and, the gratings of two groups of conductive pixel films are interspersed with each other, one group of the conductive pixel films being inserted into the slit of the other group of the conductive pixel films to realize no-clearance combination. By combining the conductive pixel films in a staggered manner, a limited space of a pixel region may be effectively utilized; meanwhile, the staggered arrangement of the conductive pixel films enables an edge electric field to be distributed more uniformly and may improve the penetration rate of pixels.

Each of the display drivers includes an active layer, a TFT drain and a pixel through hole, wherein one end of the TFT drain extends into the active layer while the other end thereof extends into the conductive pixel films, and the pixel through hole is formed at an extension end of the TFT drain. The conductive pixel films are electrically connected to the TFT drains through the pixel through holes. When the TFT drains are in high potentials, the conductive pixel films are charged.

Preferably, an included angle between the gratings and the adjacent grating lines is 95°-110°, and there are two to six gratings in each group of the conductive pixel films. The larger the included angle is, the larger the angle view of the panel display is. However, the larger the included angle is, the less the area of pixels is, and the lower the penetration rate is. The included angle is typically in a range of 95°-110°.

Compared with the prior art, in the LCD display device with an switchable angle of view provided by the present invention, mainly by adjusting an electric field for controlling the liquid crystal deflection, the angle of view of a liquid crystal display is changed. As at least two display drivers provided within a pixel region are matched with conductive pixel films, respectively, the voltage of the display drivers is changed by different control signals or switchover operations. By controlling the on or off of the corresponding conductive pixel films to change the orientation of liquid crystal molecules, the purpose of controlling and switching between the wide-angle mode and the narrow-angle mode is achieved. Richer view experience is provided to audiences. In an existing pixel region, as a plurality of conductive pixel films are additionally provided and interspersed with each other, without increasing the accommodation space, the limited space of the pixel region is effectively utilized.

DETAILED DESCRIPTION OF THE PREFERRED EMBODIMENTS

Figure 1:
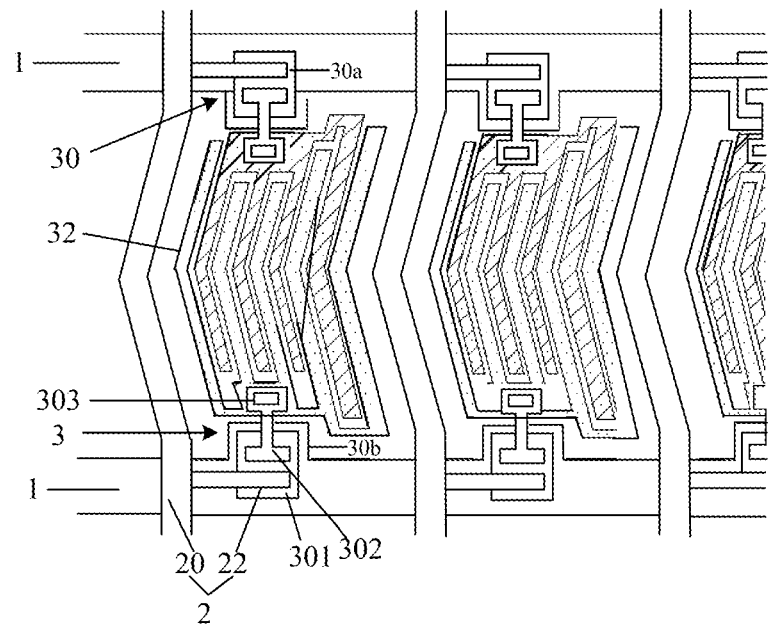
FIG. 1 is a structure diagram of an LCD display device with a switchable angle of view according to the present invention.

In view of the problem that the angle of view of an existing flat panel display is too wide, referring to FIG. 1, the present invention provides an LCD display device with a switchable angle of view, including two grating lines 1, a signal line 2 and pixel components 3. The signal line 2 runs between the two grating lines 1, wherein each group of the pixel components 3 includes at least two display drivers 30 and at least two conductive pixel films 32, the display drivers and the conductive pixel films being electrically connected to each other correspondingly. The display drivers 30 are embedded into the grating lines 1, respectively, and are electrically connected to the grating lines 1. When the display drivers 30 respectively disposed on different sides are turned on simultaneously, the LCD display device is switched to a narrow-angle mode. When one of the display drivers 30 is turned on separately or the display drivers 30 disposed on a same side are turned on simultaneously, the LCD display device is switched to a wide-angle mode.

The two grating lines 1 are across upper and lower sides of the pixel components 3 to act as positive and negative electrodes of the conductive pixel films, and the signal line 2 is connected between the two grating lines. The two grating lines 1 are used for driving two display drivers 3 on the upper and lower sides of the pixel, respectively. When in narrow angle of view, the two grating lines 1 are shorted, and the two display drivers 30 are turned on; and when in a wide angle of view, the upper grating is disconnected from the lower grating line, the lower grating line is shorted to a potential Vgh, and the signal line is used for charging the pixel. The signal line 2 includes a connecting line 20 and a TFT source 22, wherein the TFT source 22 is perpendicular to the connecting line 20, and the TFT source 22 extends into the grating lines 1 and is imported into the display drivers 30 to connect the signal line 20 with the display drivers 30. Each of the display drivers 30 includes an active layer 301, an TFT drain 302 and a pixel through hole 303, wherein one end of the TFT drain 302 extends into the active layer 301 while the other end thereof extends into the conductive pixel films 32, and the pixel through hole 303 is formed at an extension end of the TFT drain 302. The two electrodes are embedded into the conductive pixel films 32 to apply a voltage for charging. An electric field is formed between the two electrodes, to control the orientation and tilt angle of the liquid crystal molecules in the conductive pixel films 32. The conductive pixel films 32 are electrically connected to the TFT drains 302 through the pixel through holes 303. When the TFT drains 302 are in a high potential, the conductive pixel films 32 are charged. The active layers are semiconductor layers (for example, a-Si, LTPS, IGZO, etc.).

In the present invention, there is an even number of display drivers 30 and an even number of conductive pixel films 32, respectively. If there are more than two display drivers 30, the display drivers 30 on different sides are controlled by different control signals, and the display drivers 30 on the same side are controlled by a same control signal. That is, when the upper grating line and the lower grating line are provided therein with at least one display driver 30, respectively, the number of display drivers 30 disposed in the upper grating line is the same as the number of display drivers 30 disposed in the lower grating line, totally an even number of display drivers, correspondingly corresponding to the conductive pixel films 32. In this case, the display drivers 30 on a same side are controlled to be activated by a same control signal, so that the conductive pixel films 32 on a single side electrically connected to the display drivers 30 are turned on and the LCD display model becomes a wide-angle mode; and, the display drivers 30 on different sides are controlled to be activated by another control signal, so that the conductive pixel films 32 on two sides electrically connected to the display drivers 30 are turned on and the LCD display model becomes a narrow-angle mode. The angle of view of a liquid crystal display depends on the structure of a liquid crystal electric field. When the two groups of pixel electrode grating structures are both used, the liquid crystal electric field is similar to a parallel plane capacitor. As the fringing field is relatively weak at this time, the angle of view is relatively narrow. When only one group of the pixel electrode grating structures is used, the fringing field of the liquid crystal electric field is relatively intensive, so the angle of view is relatively wide. By changing the structure and intensity of a liquid crystal electric field, the purpose of switching between the wide-angle mode and the narrow-angle mode of a liquid crystal display is achieved.

Figure 2:
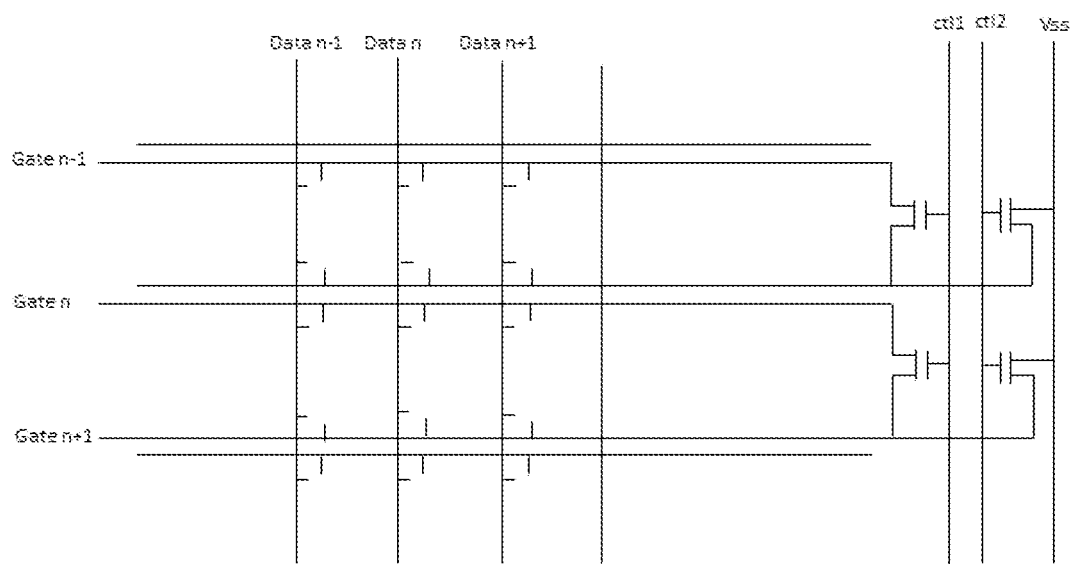
FIG. 2 is a circuit diagram of an LCD display device with a switchable angle of view according to the present invention.
Figure 3:
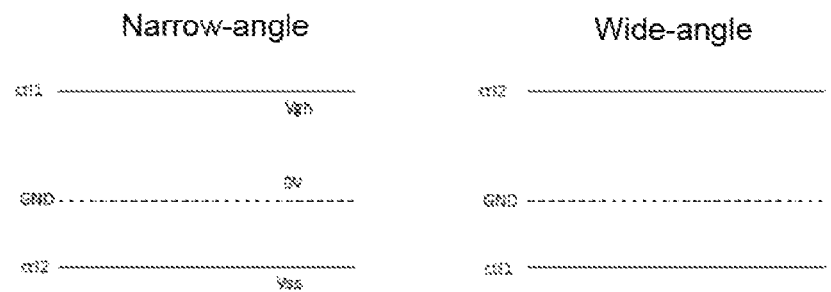
FIG. 3 is a timing diagram of angle switchover control of an LCD display device with a switchable angle of view according to the present invention.

In a preferred embodiment of the present invention, referring to FIG. 1, there are two display drivers 30 and two conductive pixel films 32, respectively. The display drivers 30 are an upper display driver 30a and a lower display driver 30b. When the upper display driver 30a and the lower display driver 30b are turned on simultaneously, the LCD display device is switched to a narrow-angle mode; and, when the upper display driver 30a or the lower display driver 30b is turned on separately, the LCD display device is switched to a wide-angle mode. The upper display driver 30a and the lower display driver 30b are controlled by different control signals, so that the drive states of the upper display driver 30a and the lower display driver 30b are controlled separately to realize a switchover between the wide-angle and narrow-angle display modes. With reference to FIG. 2 and FIG. 3, in panel control signal diagrams at different angles of view, when ctl1 is in a high potential and ctl2 is in a low potential, the upper display driver 30a and the lower display driver 30b are activated simultaneously, the two conductive pixel films 32 connected thereto are both turned on, and the LCD display device is in a narrow-angle state. When ctl1 is in a low potential and ctl2 is in a high potential, the upper display driver 30a or the lower display driver 30b is activated separately, the conductive pixel film 32 connected thereto is turned on separately, and the LCD display device is in a wide-angle state. By switching and controlling the voltage applied to the upper display driver and the voltage applied to the lower display driver, the direction of the electric field is changed, the angle of the orientation of liquid crystal molecules in the electric field is further changed, and the purpose of switching between the wide-angle mode and the narrow-angle mode is achieved. When ctl1 is in a high potential and ctl2 is in a low potential, both the upper display driver 30a and the lower display driver 30b are turned on, and the LCD display device enters a narrow-angle mode. When ctl1 is in a low potential and ctl2 is in a high potential, the upper display driver 30a is turned on, the lower display driver 30b is turned off, and the LCD display device enters a wide-angle mode.

Figure 4:
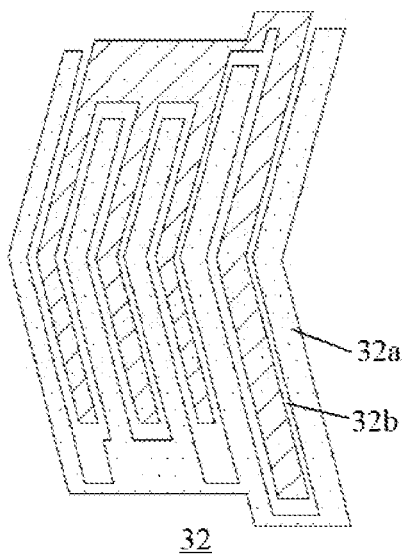
FIG. 4 is a structure diagram of a combination of conductive pixel films of an LCD display device with a switchable angle of view according to the present invention.
Figure 5:
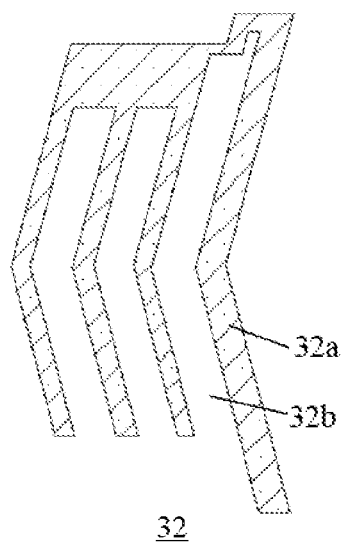
FIG. 5 is a structure diagram of a single conductive pixel film in an LCD display device with a switchable angle of view according to the present invention.

Referring to FIG. 4 and FIG. 5, in a preferred embodiment of the present invention, in terms of arrangement structure of the conductive pixel films, the two conductive pixel films 32 are staggered with each other. Each of the conductive pixel films 32 has a plurality of parallel gratings 32a with a slit 32b provided between adjacent gratings 32a. The two groups of conductive pixel films 32 are opposite to each other in an inverted manner so as to make the gratings 32a interspersed with each other, wherein the gratings 32a of one group of the conductive pixel films 32 are inserted into the slit 32b of the other group of the conductive pixel films to realize no-clearance combination. Thus, the space of a pixel region may be effectively utilized, and the requirements of fine and ultra-thin LCD display devices are also met while achieving the purpose of switching between the wide-angle mode and the narrow-angle mode. An included angle α between the gratings and the adjacent grating lines is 95°-110°. The larger the included angle is, the larger the angle view of the panel display is. However, the larger the included angle is, the less the area of pixels is, and the lower the penetration rate is. The included angle is typically in a range of 95°-110°. There are two to six gratings in each group of the conductive pixel films. In this embodiment, there are four gratings, and the two conductive pixel films are interspersed oppositely. The gratings of one group of the conductive pixel films are inserted into the slit of the other group of the conductive pixel films.

What is claimed is:

1. An LCD display device With a switchable angle view comprising two grating lines, a signal line and pixel components, the signal line running between the two grating lines, wherein each group of the pixel components comprises at least two display drivers and at least two conductive pixel films, the display drivers and the conductive pixel films being electrically connected to each other correspondingly; the display drivers are embedded into the grating lines, respectively, and are electrically connected to the grating lines; when the display drivers respectively disposed on different sides are turned on simultaneously, the LCD display device is switched to a narrow-angle mode; when one of the display drivers is turned on separately or the display drivers disposed on a same side are turned on simultaneously, the LCD display device is switched to a wide-angle mode; and, if there are more than two display drivers, the display drivers on different sides are controlled by different control signals, and the display drivers on the same side are controlled by a same control signal, wherein there are two display drivers and two conductive pixel films, respectively, the display drivers being an upper display driver and a lower display driver; when the upper display driver and the lower display driver are turned on simultaneously, the LCD display device is switched to a narrow-angle mode; and, when the upper display driver or the lower display driver is turned on separately, the LCD display device is switched to a wide-angle mode, wherein the two conductive pixel films are staggered with each other, wherein each of the conductive pixel film has a plurality of parallel gratings with a slit provided between adjacent gratings; and, the gratings of two groups of conductive pixel films are interspersed with each other, one group of the conductive pixel films being inserted into the slit of the other group of the conductive pixel films to realize no-clearance combination, wherein an included angle between the gratings and the adjacent grating lines is 95°-110°, and the two conductive pixel films having same extending direction.

2. The LCD display device with a switchable angle of view according to claim 1, wherein there is an even number of display drivers and an even number of conductive pixel films, respectively.

3. The LCD display device with a switchable angle of view according to claim 2, wherein the upper display driver and the lower display driver are controlled by different control signals.

4. The LCD display device with a switchable angle of view according to claim 3, wherein each of the display drivers comprises an active layer, a TFT drain and a pixel through hole, wherein one end of the TFT drain extends into the active layer while the other end thereof extends into the conductive pixel films, and the pixel through hole is formed at an extension end of the TFT drain.

5. The LCD display device with a switchable angle of view according to claim 2, wherein there are two to six gratings in each group of the conductive pixel films.

6. An LCD display device with a switchable angle of view, comprising two grating lines, a signal line and pixel components, the signal line running between the two grating lines, wherein each group of the pixel components comprises at least two display drivers and at least two conductive pixel films, the display drivers and the conductive pixel films being electrically connected to each other correspondingly; the display drivers are embedded into the grating lines, respectively, and are electrically connected to the grating lines; when the display drivers respectively disposed on different sides are turned on simultaneously, the LCD display device is switched to a narrow-angle mode; and when one of the display drivers is turned on separately or the display drivers disposed on a same side are turned on simultaneously, the LCD display device is switched to a wide-angle mode, wherein there are two display drivers and two conductive pixel films, respectively, the display drivers being an upper display driver and a lower display driver; when the upper display driver and the lower display driver are turned on simultaneously, the LCD display device is switched to a narrow-angle mode; and, when the upper display driver or the lower display driver is turned on separately, the LCD display device is switched to a wide-angle mode, wherein the two conductive pixel films are staggered with each other, wherein each of the conductive pixel film has a plurality of parallel gratings with a slit provided between adjacent gratings; and, the gratings of two groups of conductive pixel films are interspersed with each other, one group of conductive pixel films being inserted into the slit of the other group of the conductive pixel films to realize no-clearance combination, wherein an included angle between the gratings and the adjacent grating lines is 95°-110°, and the two conductive pixel films having same extending direction.

7. The LCD display device with a switchable angle of view according to claim 6, wherein there is an even number of display drivers and an even number of conductive pixel films, respectively.

8. The LCD display device with a switchable angle of view according to claim 7, if there are more than two display drivers, the display drivers on different sides are controlled by different control signals, and the display drivers on the same side are controlled by a same control signal.

9. The LCD display device with a switchable angle of view according to claim 6, wherein the upper display driver and the lower display driver are controlled by different control signals.

10. The LCD display device with a switchable angle of view according to claim 9, wherein each of the display drivers comprises an active layer, a TFT drain and a pixel through hole, and wherein one end of the TFT drain extends into the active layer while the other end thereof extends into the conductive pixel films, and the pixel through hole is formed at an extension end of the TFT drain.

\* \* \* \* \*